(12) United States Patent
Akita

(10) Patent No.: US 8,741,503 B2
(45) Date of Patent: Jun. 3, 2014

(54) MANUFACTURE METHOD FOR POLYMER ELECTROLYTE FUEL, AND POLYMER ELECTROLYTE FUEL CELL MANUFACTURED BY THE METHOD

(75) Inventor: Yasuhiro Akita, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 516 days.

(21) Appl. No.: 13/119,007

(22) PCT Filed: Sep. 14, 2009

(86) PCT No.: PCT/IB2009/006737
§ 371 (c)(1),
(2), (4) Date: Mar. 15, 2011

(87) PCT Pub. No.: WO2010/032099
PCT Pub. Date: Mar. 25, 2010

(65) Prior Publication Data
US 2011/0165498 A1 Jul. 7, 2011

(30) Foreign Application Priority Data
Sep. 19, 2008 (JP) ................. 2008-241090

(51) Int. Cl.
H01M 8/02 (2006.01)
H01M 8/10 (2006.01)

(52) U.S. Cl.
USPC ............ 429/492; 429/535; 429/463; 427/115

(58) Field of Classification Search
USPC ................. 429/452, 463, 465, 467–469, 479, 429/491–494, 507–510, 535; 427/115
See application file for complete search history.

(56) References Cited

U.S. PATENT DOCUMENTS

| 2006/0024563 A1* | 2/2006 | Ogura ........................... 429/44 |
| 2006/0078781 A1* | 4/2006 | Stegink et al. .................. 429/35 |
| 2006/0099330 A1 | 5/2006 | Nakamura et al. |

FOREIGN PATENT DOCUMENTS

| CN | 101036256 | 9/2007 |
| EP | 1 403 949 A1 | 3/2004 |
| JP | 3368907 | 11/2002 |
| JP | 2003-82488 | 3/2003 |
| JP | 2005-517273 | 6/2005 |
| JP | 3690682 | 6/2005 |
| JP | 2007-66766 | 3/2007 |
| JP | 2007-250248 | 9/2007 |
| JP | 2008-516395 | 5/2008 |
| WO | WO 2006/013108 A | 2/2006 |
| WO | WO 2006/041677 | 4/2006 |

OTHER PUBLICATIONS

International Search Report in International Application No. PCT/IB2009/006737; Mailing Date: Feb. 1, 2010.
Written Opinion of the International Searching Authority in International Application No. PCT/IB2009/006737; Mailing Date: Feb. 1, 2010.
Notification of Reason(s) for Refusal in Japanese Patent Application No. 2008-241090; Drafting Date: Dec. 20, 2010.

* cited by examiner

Primary Examiner — Carlos Barcena
(74) Attorney, Agent, or Firm — Finnegan, Henderson, Farabow, Garrett & Dunner, LLP

(57) ABSTRACT

A protective layer (20) is formed in a picture frame shape and a thin film shape between an electrolyte membrane (1) and a peripheral edge portion of a catalyst layer (30) by applying ink by an ink jet method. The protective layer (20) is formed directly on the electrolyte membrane (1) to a thickness in the range of about 0.1 μm to 5.0 μm.

14 Claims, 2 Drawing Sheets

MANUFACTURE METHOD FOR POLYMER ELECTROLYTE FUEL, AND POLYMER ELECTROLYTE FUEL CELL MANUFACTURED BY THE METHOD

CROSS-REFERENCE TO RELATED APPLICATIONS

This application is a national phase application of International Application No. PCT/IB2009/006737, filed Sep. 14, 2009, and claims the priority of Japanese Application No. 2008-241090, filed Sep. 19, 2008, the contents of both of which are incorporated herein by reference.

BACKGROUND OF THE INVENTION

1. Field of the Invention

The invention relates to a manufacture method for a polymer electrolyte fuel cell (hereinafter, abbreviated as "PEFC"), and to the PEFC. More particularly, the invention relates to a manufacture method for a PEFC that has a protective layer in a unit cell structural body, and to the PEFC.

2. Description of the Related Art

Generally, PEFCs are roughly divided into two types, that is, a first type unit that is a basic unit that includes an electrolyte membrane, an anode catalyst layer and a cathode catalyst layer that sandwich the electrolyte membrane, and an anode diffusion layer and a cathode diffusion layer that are disposed on an outer side of the anode catalyst layer and an outer side of the cathode catalyst layer, respectively, and a second type unit that is a more industrial and practical unit that has a membrane-electrode assembly (hereinafter, abbreviated as "MEA") in which an electrolyte membrane, and catalyst layers sandwiching the electrolyte membrane are integrated, and diffusion layers disposed on outer sides of the catalyst layers so as to sandwich the MEA. Then, a laminate that includes the component elements of the first or second type unit is hot-pressed so that the component elements are joined. Thus, a portion that corresponds to a unit cell structural body is fabricated.

In the second type unit (where an MEA is included), as for example, if a support of the electrolyte membrane is not provided on the inside of a gas seal member (protective layer) that surrounds a peripheral edge portion of the MEA in the manner or a picture frame, the differential pressure of the fuel gas or the oxidizing gas can sometimes break a peripheral edge portion of the MEA due to strain of a component element caused by the thermal stress or the mechanical stress caused by variation in humidity.

Japanese Patent No. 3368907 discloses a structural body 50 (that corresponds to a half of a unit cell structural body, and therefore will be referred to as "half-cell structural body 50") which is made up of component elements as shown in an exploded view in FIG. 4A, and which is capable of preventing the damages to the electrolyte membrane caused by differential pressure or mechanism stress that acts on the electrolyte membrane. This half-cell structural body 50 is fabricated by superimposing an electrolyte membrane 1 on a carrier membrane 4, and superimposing a separately formed picture frame-shape protective layer 2 on a peripheral edge portion 1E (that includes a picture frame-shape portion of the electrolyte membrane 1 between the end portion and an imaginary dashed line S) of a surface 1S of the electrolyte membrane 1, and laying a catalyst layer (catalyst electrode portion) 3 on the picture frame-shape protective layer 2, and integrating the thus-laminated body by hot pressing.

Besides, Japanese Patent No. 3368907 also discloses a fluorine-based resin sheet of 25 µm in thickness as a membrane that corresponds to the protective layer 2. In the case where the protective layer 2 is a thick membrane, if the picture frame-shape protective layer 2 of 25 µm in thickness is hot-pressed to the electrolyte membrane 1, a large step is formed between the protective layer 2 and the electrolyte membrane 1, so that buckled sites occur in a peripheral end portion of the catalyst layer 3, and creep deformation of the electrolyte membrane 1 is caused. As a result, it becomes impossible to secure reliability of the fuel cell.

Besides, Japanese Patent No. 3690682 discloses an example in which a synthetic resin that melts at a processing temperature at which the picture frame-shape protective layer 2 is hot-pressed, for example, polyethylene, or an ethylene-vinyl acetate copolymer resin, is used. However, while high-temperature operation is desired in order to achieve size reduction and performance improvement of a fuel cell system, a polyethylene material whose thermal deformation temperature or continuous operation temperature is 100° C. or lower cannot secure reliability of the fuel cell. Japanese Patent Application Publication No. 2007-66766 (JP-A-2007-66766) discloses that a hot-melt adhesive, such as an acrylic adhesive, an olefin-based adhesive, etc., is used as an edge seal (corresponding to a protective layer portion). However, since the hot-melt adhesive has the property of melting at certain temperature, the thermal deformation temperature or the continuous operation temperature becomes low, so that reliability of the fuel cell cannot be secured as in the foregoing case of a polyethylene material.

SUMMARY OF THE INVENTION

Accordingly, the invention provides a polymer electrolyte fuel cell (PEFC) that prevents occurrence of a buckled site in a peripheral end portion of a catalyst layer, and also prevents creep deformation of an electrolyte membrane, and that therefore secures reliability, and also provides a manufacture method for the fuel cell.

A first aspect of the invention relates to a manufacture method for a polymer electrolyte fuel cell that includes an electrolyte membrane, a catalyst layer, and a protective layer. This manufacture method includes forming a thin-film protective layer in a picture frame shape by applying a resin material to a peripheral edge portion of the electrolyte membrane by an ink jet method.

Due to this construction, the thick-film protective layer in a related art is changed to a thin-film shape. Therefore, the protective layer will not damage the catalyst layer or the electrolyte membrane, so that reliability of the fuel cell will improve. Besides, since the protective layer is formed from ink directly on the electrolyte membrane by the ink jet method, a separate process of punching a picture frame-shape protective layer out of a resin-made sheet material can be omitted. Hence, useless stock of picture frame-shape protective layers will no longer occur, leading to reduced cost and improved productivity.

Besides, since the protective layer can easily be presented with various dimensions and in various shapes at a site of the ink-jet application on a display screen of a PC (personal computer) through the use of image processing software, high versatility can be achieved. Besides, since the protective layer is formed by using an ink that has high wetting characteristic and good fluidity, instead of a thick-film resin sheet material, it is also possible to achieve dense formation without forming spaces at stepped portions (vertical wall portions) between the protective layer and the electrolyte membrane, so that a protective layer excellent in sealing characteristic and durability can be formed.

Furthermore, in a polyimide film whose film thickness is about 25 μm, an edge portion tends to sharply contact the catalyst layer, and thus damage the catalyst layer. However, as for the protective layer formed by ink (ink-applied layer), the wetting characteristic of a peripheral portion thereof with respect to the electrolyte membrane is high, so that ink flows along the surface of the electrolyte membrane in a maintain skirt shape, and therefore does not form an edge portion.

In the manufacture method in accordance with the first aspect of the invention, the electrolyte membrane and the catalyst layer may be stacked, and the peripheral edge portion of the electrolyte membrane may be a peripheral edge portion of a catalyst layer-side main surface of the electrolyte membrane.

In the manufacture method in accordance with the first aspect of the invention, the protective layer may be in contact with a peripheral edge portion of one of main surfaces of the catalyst layer.

In the manufacture method in accordance with the first aspect of the invention, the fuel cell may include a membrane-electrode assembly which has the electrolyte membrane and the catalyst layer, and in which a planar dimension of the catalyst layer is set smaller than the planar dimension of the electrolyte membrane, and the protective layer may be formed in the picture frame shape along the electrolyte membrane from a peripheral edge portion of the catalyst layer so that the protective layer extends along the electrolyte membrane from the peripheral edge portion of the catalyst layer. According to the foregoing construction, the formation of the protective layer in the first aspect of the invention is applicable to a polymer electrolyte fuel cell that includes a membrane-electrode assembly (MEA) in which catalyst layers and an electrolyte membrane are integrated together beforehand.

In the manufacture method in accordance with the first aspect of the invention, heat-resistant temperature of the resin material may exceed at least 100° C. Due to this construction, if the heat-resistant temperature of the resin material of the protective layer exceeds at least 100° C., the high-temperature operation needed for size reduction and performance improvement of a fuel cell system becomes possible. In other words, if a resin whose heat-resistant temperature exceeds at least 100° C. is not used, the demand for the high-temperature operation cannot be met.

In the manufacture method in accordance with the first aspect of the invention, the heat-resistant temperature of the resin material may be a temperature at or above which the resin material exhibits plasticity.

In the manufacture method in accordance with the first aspect of the invention, the resin material may include a fluorine-based resin. According to this construction, the resin is provided with water repellency. If the protective layer is water repellent, the drainage of water or moisture present within the fuel cell (unit cell structural body) can be improved with respect to the protective layer portion as well. Therefore, occurrence of flooding can be restrained.

In the manufacture method in accordance with the first aspect of the invention, the resin material may include a polyimide-based resin. According to the this construction, a protective layer able to withstand even higher temperatures can be formed.

In the manufacture method in accordance with the first aspect of the invention, the resin material may include a hydrocarbon-based electrolyte resin.

According to the foregoing construction, the resin also enters or penetrates into the adjacent joined catalyst layer, thus providing more excellent proton conductivity.

In the manufacture method in accordance with the first aspect of the invention, thickness of the protective layer may be 0.1 μm to 0.5 μm.

In the manufacture method in accordance with the first aspect of the invention, when the resin material is applied by the ink jet method, dot pitch of an ink jet printer used to apply the resin material may be set at 400 dpi to 1200 dpi.

A second aspect of the invention relates to a half-cell structural body of a polymer electrolyte fuel cell which has an electrolyte membrane, a catalyst layer, and a protective layer. This fuel cell is manufactured by a manufacture method that includes applying a resin material to a peripheral edge portion of the electrolyte membrane by an ink jet method, and forming the protective layer in a thin film shape and a picture frame shape, and the protective layer is made up of the resin material that is applied. Besides, the half-cell structural body includes the electrolyte membrane, the catalyst layer, and the protective layer.

The polymer electrolyte fuel cell may include a unit cell structural body that has two half-cell structural bodies in accordance with the second aspect of the invention.

In the fuel cell in accordance with the second aspect of the invention, the unit cell structural body may be manufactured in such a manner that the two half-cell structural bodies share an electrolyte membrane, or the electrolyte membrane of one of the two half-cell structural bodies and the electrolyte membrane of another one of the two half-cell structural bodies are stuck to each other. According to this construction, since the protective layer is formed in a picture frame shape and in a thin film shape by the ink jet method, and protects the catalyst layer, and the electrolyte membrane, occurrence of a fault due to the thick-film protective layer (e.g., having a thickness of 25 μm to 50 μm) in accordance with the related art is restrained, so that the durability of the PEFC can be improved.

A further aspect of the invention relates to a manufacture method for a polymer electrolyte fuel cell that includes a membrane-electrode assembly in which a planar dimension of a catalyst layer is set smaller than the planar dimension of an electrolyte membrane. This manufacture method includes forming a thin-film protective layer in a picture frame shape along the electrolyte membrane from a peripheral edge portion of the catalyst layer by applying a resin material by an ink jet method so that the protective layer extends along the electrolyte membrane from the peripheral edge portion of the catalyst layer.

According to the invention, faults, such as damages to a catalyst layer or an electrolyte membrane, or the creep deformation of an electrolyte membrane, can be prevented, and therefore durability of the polymer electrolyte fuel cell (PEFC) can be improved.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
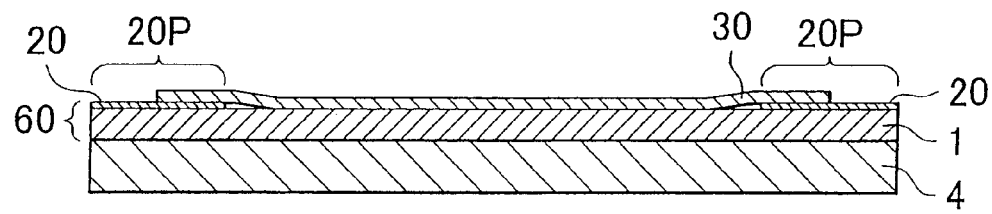
FIG. 1 is a schematic sectional view for describing a first embodiment of the invention.
Figure 2:
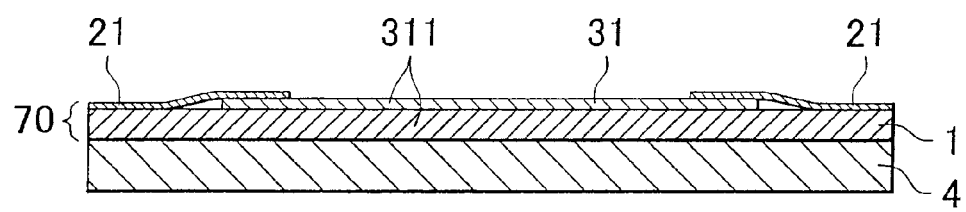
FIG. 2 is a schematic sectional view for describing a second embodiment of the invention.

Hereinafter, embodiments of the invention will be described with reference to FIG. 1, and FIG. 2. FIGS. 1 and 2 are diagrams for showing embodiments of a fuel cell in accordance with the invention, and of a manufacture method for the fuel cell. In the drawings, portions indicated by the same reference characters represent the same portions.

FIGS. 1 and 2 are schematic sectional views for describing manufacture methods in accordance with the first and second embodiments of the invention which manufacture half-cell structural bodies at an anode side or a cathode side in a PEFC.

With reference to FIG. 1, a method of manufacturing a first half-cell structural body 60 (a half-cell structural body in accordance with the first embodiment is termed "first half-cell structural body") will be described. As shown in FIG. 1, the first half-cell structural body 60 is formed on a carrier film 4, and includes an electrolyte membrane 1, a picture frame-shape protective layer 20, and a catalyst layer 30. The picture frame-shape protective layer 20 is in contact with a peripheral edge portion of an electrolyte membrane 1-side main surface of the catalyst layer 30.

The carrier film 4 is a resin film that partially contains polyester, such as a polyimide, PET (polyethylene terephthalate), etc., and a fluorine-based resin, such as ETFE (4-fluorinated ethylene copolymer), PTFE (polytetrafluoroethylene), etc., and polyolefin, such as PE (polyethylene), PP (polypropylene), etc. The thickness of the carrier film 4 may be 40 µm to 60 µm. If the thickness of the carrier film 4 is less than 40 µm, the carrier film 4 is not able to perform the function as a supporter. If the thickness thereof is greater than 60 µm, a cost increase is brought about. Besides, the carrier film 4 may also have a surface property such that the carrier film 4 and the electrolyte membrane 1, when hot-pressed, do not undergo fusion, chemical binding, or physical binding. For an operation in an intermediate step, the carrier film 4 is easily peeled from the electrolyte membrane 1.

The electrolyte membrane 1 is formed from, for example, Nafion of DuPont, on the carrier film 4 by applying it thereto to a thickness of 10 µm to 30 µm. The electrolyte membrane 1 may also be formed from a material other than Nafion which is an electrolyte that has a proton permeability.

Figure 4A:
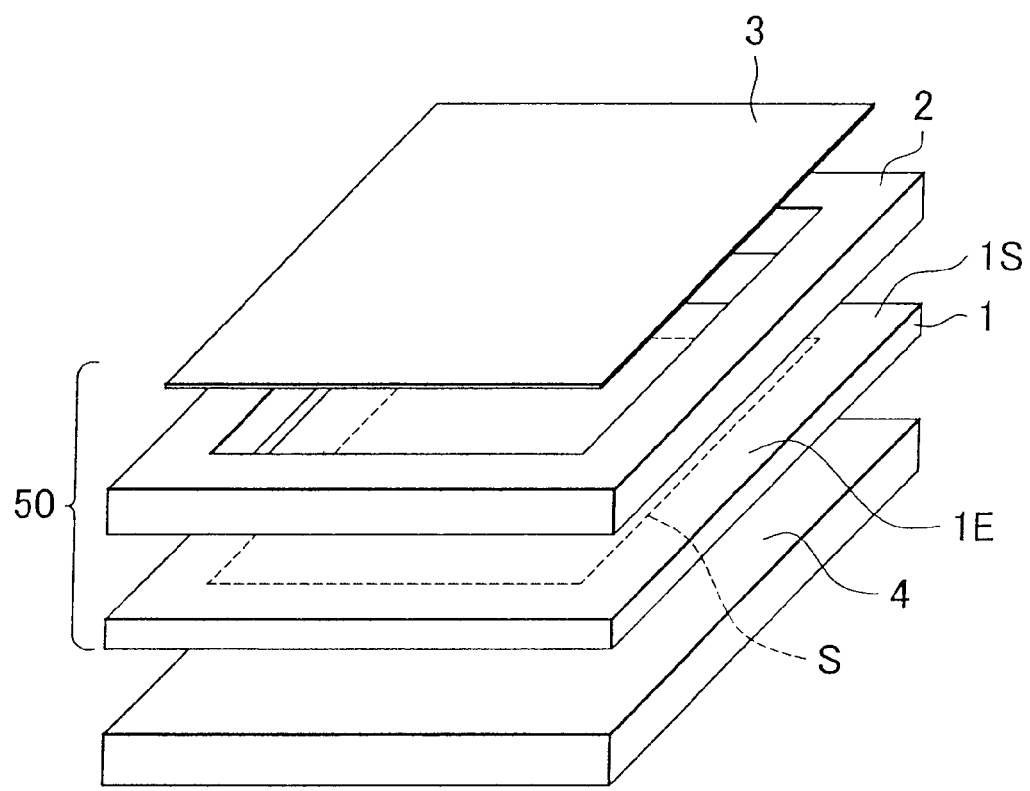
FIGS. 4A and 4b are a schematic perspective view and a schematic sectional view, respectively, for describing a manufacture method in accordance with the related art.
Figure 4B:
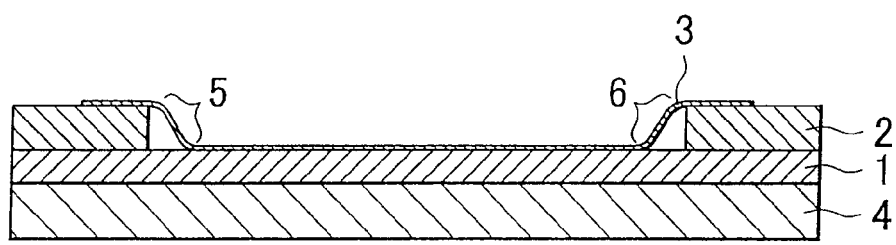

The picture frame-shape protective layer 20 is formed directly on a main surface of the electrolyte membrane 1 which is not in contact with the carrier film 4, so as to have a picture frame shape, and a thin film shape, by an ink jet method. The thickness of the picture frame-shape protective layer 20 may be 0.1 µm to 0.5 µm. The picture frame-shape protective layer 2 in a related-art technology shown in FIGS. 4A and 4B is not formed directly on the carrier film 4, but is provided as a separate member by punching a thick film resin-made plate into a picture frame shape, and thus is different from the picture frame-shape protective layer 20 in accordance with the embodiment.

In the ink jet method, a picture frame-shape image having appropriate dimensions is drawn through the use of image processing or CAD software in a PC, and the image is sent to an ink jet printer, so that an ink for forming the protective layer 20 is applied from the nozzles of the ink jet printer corresponding to the image. As a result, a picture frame-shape protective layer 20 is formed on a peripheral edge portion 20P that is a peripheral edge portion of a main surface of the electrolyte membrane 1 that does not contact the carrier film. The image pitch (dpi) of the ink jet printer may be set at, for example, 400 dpi to 1200 dpi, in order to make the protective layer 20 dense.

Because of the application by the ink jet method, the protective layer 20 is formed as a thin film. Besides, the dimensions and the shape of the protective layer 20 can be arbitrarily changed on the display screen of a PC. Besides, there is no need to form or process the picture frame-shape protective layer 2 as a separate member. Since the thin-film resin sheet material does not have strength or toughness, it is difficult to perform a punching process in order to obtain a rectangular thin-film resin sheet material. Therefore, it is necessary to take care not to allow attachment of cutting debris or the like. Besides, in order to obtain a desired thickness of the thin film, the nozzles that jet out ink may be moved back and forth over the same area to apply a plurality of layers of ink.

Next, the material of the ink for forming the protective layer 20 will be described in detail. The ink material may have a heat-resistant temperature of at least 100° C., and may have excellent acid resistance, excellent heat resistance, and excellent proton conductivity. Herein, the heat-resistant temperature is a temperature at and above which the resin exhibits plasticity. More concretely, the ink material may be any one of fluorine-based resin, polyimide-based resin, and hydrocarbon-based electrolyte resin, or a resin of any combination of these resins. As the fluorine-based resin, a polyvinylidene fluoride (PVDF) that provides high acid resistance is preferable. As the polyimide-based resin, one that has proton transportation capability is preferable, and particularly, sulfonated polyimide that provides high heat resistance is preferable. As the hydrocarbon-based electrolyte resin, one that has proton transportation capability is preferable, and particularly, sulfonated polyphenylene sulfide is preferable.

Other preferable kinds of materials are resins that include polyamide, polyester, thermoplastic fluorocarbon rubber, tetrafluoroethylene-hexafluoropropylene copolymer (ETFE), tetrafluoroethylene-hexafluoropropylene-hexafluoropropylene-vinylidene ternary copolymer (THV), tetrafluoropropylene copolymer (FEP), a ternary copolymer of tetrafluoroethylene-hexafluoropropylene-perfluoro alkyl vinyl ether (EPA), etc.

Furthermore, in the case where the protective layer 20 is to enhance the proton conductivity while entering the catalyst layer 30, a material containing a hydrocarbon-based electrolyte (that has proton transportation capability) may also be used. More concretely, besides the foregoing sulfonated polyphenylene sulfide, it is also possible to use any one of polymers and copolymers of polybenzimidazole, polyether ether ketone, polyether sulfone, etc. In addition, when a solution of such a polymer is prepared, as a solution in which hydrocarbon-based electrolyte is soluble, alcohol and water as well as N-methyl-pyrrolidone (NMP), dimethyl formaldehyde (DMF); dimethyl sulfoxide (DMSO), etc. can be used. Besides, other substances, solutions, etc., for viscosity adjustment needed for preparation of an ink and optimization of pot-life or the like, may be prepared according to the usual methods.

Finally, after the catalyst layer 30 is formed so as to be layered on the electrolyte membrane 1 with the protective layer 20 formed thereon, the carrier film 4 is peeled off from the electrolyte membrane 1. Thus, a half-cell structural body 60 is fabricated which includes the electrolyte membrane 1, the catalyst layer 30, and the protective layer 20 that is formed in a picture frame shape directly on a peripheral edge portion of the electrolyte membrane 1 by applying thereto a resin material to a thickness of 0.1 μm to 5.0 μm by the ink jet method. The thickness of the ink-jet applied protective layer can be measured from absorbance changes in the ultraviolet and visible absorption spectrum. If the thickness of the protective layer is less than 0.1 μm, the protective layer cannot perform the function as a protective layer. If the thickness thereof is greater than 5.0 μm, the buckling of a peripheral end portion of the catalyst layer 30 and the creep deformation of the electrolyte membrane become likely to occur.

Next, with reference to FIG. 2, a method of manufacturing a half-cell structural body 70 according to a second embodiment of the invention will be described (however, descriptions of contents redundant with those of the first embodiment are omitted below as appropriate). As shown in FIG. 2, the half-cell structural body 70 is formed on a carrier film 4, and includes an MEA made up of an electrolyte membrane 1 and a catalyst layer 31, and a picture frame-shape protective layer 21. In this embodiment, the electrolyte membrane 1 and the catalyst layer 31 are integrated together beforehand. Since this MEA is one of the anode-side and cathode-side half parts due to the manufacture method, the MEA will be termed the half MEA part 311 as appropriate.

As for the half MEA part 311, the planar dimensions of the catalyst layer 31 are set smaller than the planar dimensions of the electrolyte membrane 1. The catalyst layer 31 is formed on the electrolyte membrane 1 so that a peripheral edge portion of the rectangular electrolyte membrane 1 forms an exposed portion with a certain width. With regard to the half MEA part 311, substantially the same ink as in the first embodiment is applied to a peripheral edge portion of the catalyst layer 31 and the foregoing exposed peripheral edge portion of the electrolyte membrane 1 so as to form a picture frame shape, by the ink jet method in such a manner that the applied ink covers the peripheral edge portion of the catalyst layer 31 and the exposed peripheral edge portion of the electrolyte membrane 1. Subsequently, as in the first embodiment, the carrier film 4 is peeled off from the half MEA part 311, thus fabricating the half-cell structural body 70. Therefore, the picture frame-shape protective layer 21 is in contact with a peripheral edge portion of the main surface of the catalyst layer 31 that is opposite the electrolyte membrane 1.

Incidentally, half-cell structural bodies 60 according to the first embodiment, or half-cell structural bodies 70 according to the second embodiment are fabricated in substantially the same fashion, and the electrolyte membranes 1 of two half-cell structural bodies 60 or the electrolyte membranes 1 of two half-cell structural bodies 70 are stuck to each other on their back surfaces through the use of an adhesive. Unit cell structural bodies are thus fabricated. Alternatively, after a half-cell structural body 60 or a half-cell structural body 70 is fabricated, a half-cell structural body 70 according to the second embodiment or a half-cell structural body 60 are formed substantially in the same manner directly on surfaces of the half-cell structural body 60 or the half-cell structural body 70 which carry no layer thereon. Then, the two half-cell structural bodies are subjected to hot pressing while being clamped from two opposite end surface sides. Unit cell structural bodies are thus fabricated.

Figure 3:
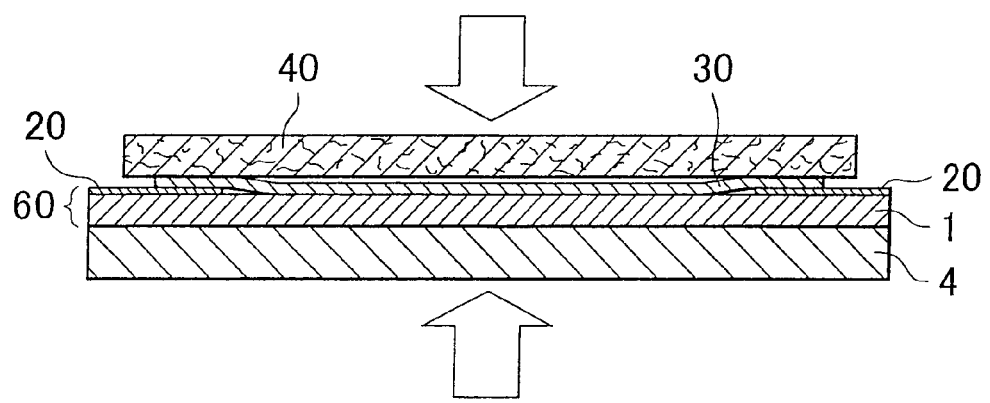
FIG. 3 is a schematic sectional view for describing a measurement method for examining the effect of the invention.

Next, Examples 1A and 2A in accordance with the first embodiment of the invention will be described. As shown in FIG. 3, a half-cell structural body 60 having an electrolyte membrane 1, a picture frame-shape protective layer 20, and a gas diffusion layer (GDL) 40 as component elements was fabricated. The material of the electrolyte membrane used in this case was a solution of Nafion DE2020CS (by DuPont). An electrolyte membrane 1 of 10 μm to 20 μm in thickness was formed by applying the Nafion DE2020CS solution to a PET film 4 (a carrier film) of 38 μm in thickness, by a cast method. After that, the PET film 4 was cut into pieces of 50 mm×50 mm.

As for the material of the protective layer 20, an ink containing PVDF was used in Example 1A, and an ink containing sulfonated polyimide was used in Example 2A. In each of Examples 1A and 2A, the protective layer 20 was formed on the electrolyte membrane by an ink jet method 1 so as to have a picture frame shape of about 10 mm in width, and have a thickness of 0.13 μm (the thickness was found from absorbance changes in the ultraviolet and visible absorption spectrum). Furthermore, a catalyst layer 30 having planar dimensions of 40 mm by 40 mm was formed by a transcription method through the use of a resin material containing a powder made up of platinum-carrying carbon particles. Then, at this time point, the PET film 4 (carrier film) was peeled off.

Then, the gas diffusion layer (GDL) 40 was cut into a width of 45 mm, and was processed so that the GDL 40 had larger planar dimensions than the catalyst layer 30, and smaller planar dimensions than the electrolyte membrane 20, as shown in FIG. 3. Then, the catalyst layer 30, the picture frame-shape protective layer 20, and the electrolyte membrane 20 were sandwiched by two GDLs 40 so that the upper one of the GDLs 40 had its center substantially coincide with the center of a space portion of the picture frame-shape protective layer 20, and had the longitudinal sides and the lateral sides thereof parallel to those of the picture frame-shape protective layer 20, and so that the lower GDL 40 had the longitudinal sides and the lateral sides thereof parallel to those of the upper GDL 40. Then, the sandwich structure was subjected to hot pressing at 130° C. and under a pressure of 4 MPa, for five minutes.

The thus-manufactured structural body including the electrolyte membrane 1, the protective layer 20, and the two GDLs 40 was left still for one hour or longer in an atmosphere of a temperature of 25° C., and a humidity of 50%. After that, the structural body was sandwiched by electroconductive metal blocks at 2.3 MPa, and a voltage of 0.2 V was applied across the sandwich structural body through the electroconductive metal blocks to measure the leak current.

As Examples 1B and 2B, two structural bodies (half-cell structural bodies) obtained as described above were joined, with the back sides of the electrolyte membranes of the two structural bodies being in contact with each other, so as to form a unit cell structural body capable of actually generating electric power. Then, hydrogen and air were caused to flow into the anode and the cathode side, respectively, to generate power at a rated current density of 0.1 A/cm$^2$ for 20 minutes. Thus, water was held in the unit cell structural body. Then, after the unit cell structural body was left standing for two hours, a heat impact test of repeatedly changing the temperature between −20° C. and 70° C. was performed. As a comparative example, using a structural body in which the layer corresponding to the protective layer 20 of the foregoing examples was replaced by a separate picture frame-shape layer of polyimide film (trade name Kapton) of 25 μm in thickness, substantially the same heat impact test as in Examples 1B and 2B was performed. Results of the measurement of the leak current in Examples 1A and 2A are shown in Table 1.

TABLE 1

|  | Processing condition | Leak current (mA) |
|---|---|---|
| Example 1A | 10-μm electrolyte membrane + PVDF protective layers (0.13 μm thick) formed by the ink jet method | 0.69 |
| Example 2A | 10-μm electrolyte membrane + sulfonated polyimide protective layers (0.13 μm thick) formed by the ink jet method | 1.80 |

Evaluation results of the heat impact temperature of Example 1B, Example 2B, and Comparative Example are shown in Table 2.

TABLE 2

|  | Processing condition | State after heat impact test |
|---|---|---|
| Example 1B | 10-μm electrolyte membrane + PVDF protective layers (0.13 μm thick) formed by the ink jet method | Good (no fault occurred) |
| Example 2B | 10-μm electrolyte membrane + sulfonated polyimide protective layers (0.13 μm thick) formed by the ink jet method | Good (no fault occurred) |
| Comparative Example | 10-μm electrolyte membrane + polyimide protective layers (25 μm thick) | Not good (An edge peripheral portion of a protective layer entered a boundary portion where the protective layer and the electrolyte member were in contact, so that a crack occurred in the electrolyte membrane.) |

From results of the measurement of the leak current (mA), it has been found that even if the electrolyte membrane is as thin as 10 μm, the presence of thin-film protective layers formed by the ink jet method in accordance with the invention sufficiently reduces the leak current. This is considered to be because although the electrolyte membrane is a thin film, the support by the protective layers improves the apparent hardness (strength) of the surfaces of the electrolyte membrane. Besides, from results of the heat impact test (heat cycle test), another reason for the sufficient reduction of the leak current is considered to be that since the film thickness of the protective layers (the film thickness thereof after the ink-jet application) is that of a thin film, the buckling of a catalyst layer, damage to an electrolyte membrane, or creep deformation of an electrolyte membrane no longer occurs.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention can be utilized when protective layers are provided in a unit cell structural body of a polymer electrolyte fuel cell.

The invention claimed is:

1. A manufacture method for a polymer electrolyte fuel cell that includes an electrolyte membrane, a catalyst layer, and a protective layer, comprising
   forming a thin-film protective layer having a thickness of 0.1 μm to 0.5 μm in a picture frame shape by applying a resin material to a peripheral edge portion of the electrolyte membrane by an ink jet method.

2. The manufacture method according to claim 1, wherein:
   the electrolyte membrane and the catalyst layer are stacked; and
   the peripheral edge portion of the electrolyte membrane is a peripheral edge portion of a catalyst layer-side main surface of the electrolyte membrane.

3. The manufacture method according to claim 1, wherein the protective layer is in contact with a peripheral edge portion of one of main surfaces of the catalyst layer.

4. The manufacture method according to claim 1, wherein;
   the fuel cell includes a membrane-electrode assembly which has the electrolyte membrane and the catalyst layer, and in which a planar dimension of the catalyst layer is set smaller than the planar dimension of the electrolyte membrane; and
   the protective layer is formed in the picture frame shape along the electrolyte membrane from a peripheral edge portion of the catalyst layer so that the protective layer extends along the electrolyte membrane from the peripheral edge portion of the catalyst layer.

5. The manufacture method according to claim 1, wherein heat-resistant temperature of the resin material exceeds at least 100° C.

6. The manufacture method according to claim 5, wherein the heat-resistant temperature of the resin material is a temperature at or above which the resin material exhibits plasticity.

7. The manufacture method according to claim 5, wherein the resin material includes a fluorine-based resin.

8. The manufacture method according to claim 5, wherein the resin material includes a polyimide-based resin.

9. The manufacture method according to claim 5, wherein the resin material includes a hydrocarbon-based electrolyte resin.

10. The manufacture method according to claim 1, wherein when the resin material is applied by the ink jet method, dot pitch of an ink jet printer used to apply the resin material is set at 400 dpi o 1200 dpi.

11. A half-cell structural body of a polymer electrolyte fuel cell, wherein the fuel cell is manufactured by the manufacture method according claim 1, and comprises:
    the electrolyte membrane;
    the catalyst layer; and
    the thin-film protective layer having a thickness of 0.1 μm to 0.5 μm.

12. A polymer electrolyte fuel cell comprising a unit cell structural body that is constructed of two half-cell structural bodies according to claim 11.

13. The fuel cell according to claim 12, wherein the unit cell structural body is manufactured in such a manner that the two half-cell structural bodies share an electrolyte membrane, or the electrolyte membrane of one of the two half-cell structural bodies and the electrolyte membrane of another one of the two half-cell structural bodies are stuck to each other.

14. A manufacture method for a polymer electrolyte fuel cell that includes a membrane-electrode assembly in which a planar dimension of a catalyst layer is set smaller than the planar dimension of an electrolyte membrane, comprising forming a thin-film protective layer having a thickness of 0.1 µm to 0.5 µm in a picture frame shape along the electrolyte membrane from a peripheral edge portion of the catalyst layer by applying a resin material by an ink jet method so that the protective layer extends along the electrolyte membrane from the peripheral edge portion of the catalyst layer.

* * * * *